United States Patent Office 3,415,905
Patented Dec. 10, 1968

3,415,905
(CARBOXYMETHYL)AMMONIUM
PHOSPHONATES
Albert Y. Garner, Yellow Springs, Ohio, assignor to Monsanto Research Corporation, St. Louis, Mo., a corporation of Delaware
No Drawing. Filed Sept. 28, 1964, Ser. No. 399,848
9 Claims. (Cl. 260—924)

ABSTRACT OF THE DISCLOSURE (Carboxymethyl)ammonium phosphonates and their esters of the general formula

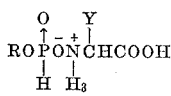

wherein R and Y are hydrogen or alkyl; useful as defoliants.

---

The present invention relates to phosphorus-containing ammonium compounds and more particularly provides a new and valuable class of (carboxyalkyl)ammonium salts of phosphonic acids or esters and the method of preparing the same.

The presently provided compounds have the formula

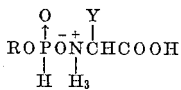

wherein R is selected from the class consisting of hydrogen and alkyl radicals of from 1 to 8 carbon atoms and Y is selected from the class consisting of hydrogen and alkyl radicals of from 1 to 4 carbon atoms. The invention thus provides the (carboxyalkyl)ammonium salts of phosphonic acid, i.e., compounds of the formula

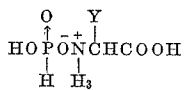

wherein Y is hydrogen or alkyl. Such compounds are ammonium phosphonates wherein one hydrogen of the ammonium radical has been replaced by a (carboxyalkyl) group. The invention also provides the (carboxyalkyl)-ammonium salts of mono-esterified phosphonic acid, i.e., compounds of the formula

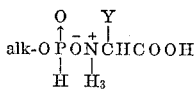

wherein alk denotes an alkyl radical of from 1 to 8 carbon atoms and Y is hydrogen or an alkyl radical of from 1 to 4 carbon atoms. Such compounds are (1-carboxyalkyl)ammonium alkyl phosphonates. They are prepared by reaction of an appropriate dialkyl phosphonate with an appropriate α-aminoalkanoic acid and water substantially according to the scheme:

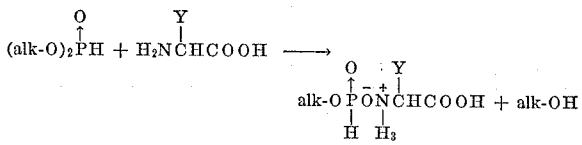

wherein alk and Y are as above defined.

The presently useful dialkyl phosphonates may be simple or mixed diesters of phosphonic acids, e.g., dimethyl, dipropyl, dibutyl, diisobutyl, dipentyl, dihexyl, diheptyl, dioctyl, bis(2-ethylhexyl), ethyl methyl, butyl isopropyl, or octyl pentyl phosphonates.

Examples of α-aminoalkanoic acids which react with the dialkyl phosphonates and water to give the (carboxyalkyl)ammonium phosphonates are glycine, alanine, α-aminobutyric acid, valine, α-aminovaleric acid, leucine, isoleucine, caprine, etc.

As shown above, reaction of the dialkyl phosphonate with the α-amino acid to give the presently provided (carboxyalkyl)ammonium alkyl phosphonates requires the presence of water and involves formation of an alcohol as by-product. The products are N-(carboxyalkyl) substituted salts of mono-esterified phosphonic acid. Thus, reaction of glycine with a dialkyl phosphonate gives a (carboxymethyl)ammonium phosphonate and an alkanol thus:

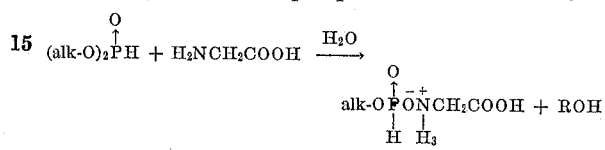

With a higher α-amino acid, reaction proceeds similarly. Thus, the reaction with isoleucine proceeds as follows to give (1-carboxy-2-methylbutyl)ammonium alkyl phosphonate:

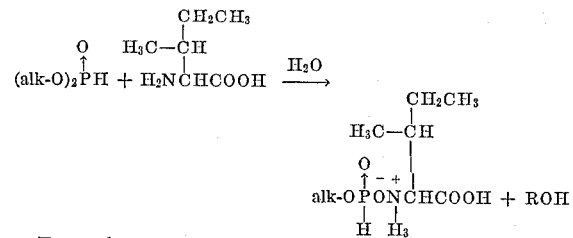

Examples of (1-carboxyalkyl)ammonium alkyl phosphonates provided by the invention and the phosphonate and amino acid reactant from which they are prepared according to this invention are shown below:

|  | Amino Acid | alk is the same as in col. 1 Y= |
|---|---|---|
| Methyl | Valine | —CH(CH$_3$)$_2$ |
| Butyl | Glycine | H |
| n-Octyl | Alanine | —CH$_3$ |
| Isopropyl | α-Aminobutyric | —CH$_2$CH$_3$ |
| 2-ethylhexyl | α-Aminovaleric | —CH$_2$CH$_2$CH$_3$ |
| Propyl | Leucine | —CH$_2$CH(CH$_3$)$_2$ |
| Pentyl | Isoleucine | —CH(CH$_3$)CH$_2$CH$_3$ |
| Isobutyl | Caprine | —CH$_2$CH$_2$CH$_2$CH$_3$ |
| Hexyl | Glycine | H |
| Methyl | Leucine | —CH$_2$CH(CH$_3$)$_2$ |
| Tert-butyl | Alanine | —CH$_3$ |
| Ethyl | α-Aminovaleric | —CH$_2$CH$_2$CH$_3$ |

The (1-carboxyalkyl)ammonium alkyl phosphonates can be hydrolyzed to give the (1-carboxyalkyl)ammonium salts of unesterified phosphonic acid, i.e., the (1-carboxyalkyl)ammonium phosphates. As will be shown hereinafter, such hydrolysis can be effected without isolating the (1-carboxyalkyl)ammonium alkyl phosphonate from the reaction mixture which is obtained from the amino acid, the dialkyl phosphonate and water.

Reaction of the amino acid with the dialkyl phosphonate takes place by simply mixing the two reactants in the presence of water at ordinary, decreased or increased temperature and in the presence or absence of an extraneous, inert organic liquid as diluent or solvent. The reaction is generally exothermic; hence, application of heat is usually unnecessary. However, in order to assure complete reaction, heating at a temperature of up to, say 125° C. may be employed. A temperature of within the range of, say, from 15° C. to 125° C. is generally useful, operation within this temperature range being conducted after the initial spontaneous temperature rise has subsided. Since reaction occurs by participation of one mole each of the amino acid, phosphonate and water, these materials are advantageously used in at least the stoichiometric proportions; however, an excess of the phosphonate or the amino acid may be employed, and such excess may conveniently serve as diluent. When an extraneous diluent or solvent is used, it may be any organic liquid which is inert under the reaction conditions, e.g., a lower alkanol, ether, hexane, benzene, dioxane, or dimethyl sulfoxide. Although water should be present in at least an equimolar proportion, it is not generally recommended that it be used as the diluent when the desired product is the mono-esterified ammonium phosphonate, particularly when substantial heating is employed, since hydrolysis of either the diester reactant or the mono-ester product may occur in the presence of large quantities of water under such conditions. It will be found that commercial preparations of the dialkyl phosphonate and/or the amino acid, and/or the diluent, when one is employed, often contain enough moisture to furnish the required molar equivalent of water. A convenient diluent, instead of water, is the alkanol which corresponds to the alcohol portion of the dialkyl phosphonate; since the same alkanol will be evolved as the by-product of the reaction, its use as the diluent will facilitate isolation of the desired product.

Progress of the reaction may generally be followed by noting initial solubilization of the reaction mixture and subsequent change in viscosity. When the desired product is the mono-ester, i.e., the alkyl (1-carboxyalkyl)ammonium phosphonate, rather than its hydrolysis product, i.e., the (1-carboxyalkyl)ammonium phosphonate, it is advisable, in experimental runs, to test samples of the reaction mixture for acidity. Thereby, reaction can be terminated before hydrolysis of the mono-ester product has occurred. Generally, however, hydrolysis can be avoided by using a diluent other than water, e.g., an alcohol or an excess of the dialkyl phosphonate. When an excess, i.e., more than an equimolar quantity, of water has been used, hydrolysis of the mono-ester can generally be prevented, or at least minimized, by not heating the reaction mixture over long periods of time.

When the product is the mono-ester, hydrolysis thereof to the (1-carboxyalkyl)ammonium phosphonate, if desired, can be effected by heating the mono-ester in the presence of dilute acid.

The product, whether it be an alkyl (1-carboxyalkyl)-ammonium phosphonate or a (1-carboxyalkyl)ammonium phosphonate, is separated from the reaction mixture by customarily employed isolating procedures, i.e., by volatilization of solvent, by-product and any unreacted material, by solvent extraction, by volatilization of impurities, etc.

The presently provided (1-carboxyalkyl)ammonium compounds are stable, well-defined materials which range from viscous liquids to waxy or crystalline solids. They are generally soluble in the lower alkanols and insoluble in ether and acetone. Both the unhydrolyzed mono-esters and the hydrolysis products possess defoliant efficacy at even low concentrations. When solutions or dispersions thereof are applied to living plants they cause leaf-drop without other substantial injury to the plant. Solutions or dusts of the compounds possess marked fungicidal and germicidal properties.

The invention is further illustrated by, but not limited to, the following examples.

Example 1

A mixture consisting of 20.0 g. (0.27 mole) of glycine, 35 ml. (0.27 mole) of diethyl phosphonate, 6 ml. of water and 50 ml. of methanol was heated on the steam bath for 5.5 hours, at the end of which time all of the solids had dissolved. The reaction mixture was allowed to stand overnight at room temperature and then washed 3 times with copious amounts of dry ether. After the third wash, crystals began to form in the ether-insoluble oil; and upon shaking, the oil crystallized completely.

The crystallized material was washed with ether and then with acetone. Filtration and air-drying gave 31.4 g. of the substantially pure (carboxymethyl)ammonium methyl phosphonate, M.P. 121.8–122.8° C., and analyzing as follows:

Calc'd for $C_3H_{10}NO_5P$, percent: C, 21.50; H, 5.85; N, 8.18; P, 18.13. Found, percent: C, 21.20; H, 5.99; N, 7.99; P, 17.91.

Infrared spectrum showed P→O and P-H absorption.

As shown by the following data, $H^1$ and $P^{31}$ nuclear magnetic resonance analyses is consistent with the structure. The $H^1$ results were:

| Chemical shift at p.p.m. | Number of H+ | | Assignment |
|---|---|---|---|
| | Relative | Theory | |
| 12.3 | 0.5 | 0.5 | One half of P-H. |
| 5.25 | 4.3 | 4.0 | Labile protons: OH, NH, HOD. |
| 4.11 | 2.0 | 2.0 | —C(O)CH$_2$— |
| 3.80 | 3.0 | 3.0 | —OCH$_3$ |
| 1.55 | 0.5 | 0.5 | One half of P-H. |

The $P^{31}$ results were:

A = 28.6 p.p.m. (quartet)
B = 11.3 p.p.m. (quartet)
$J_{PH}$ = ca 645–650 c./s.
Center of gravity = −8.65 p.p.m.

Example 2

A mixture consisting of 20.0 g. (0.27 mole) of glycine, 50 ml. (slight molar excess) of diisopropyl phosphonate and 10 ml. of water was heated, with shaking, on the steam bath for 4 hours until a solid conglomerate formed. The reaction mixture was then allowed to stand overnight at room temperature and washed well first with ether and then with acetone. The solid was filtered off, air-dried and subsequently extracted wtih methanol for 4.5 hours in a Soxhlet extractor. After removing the methanol under vacuum, the residual white solid was washed with ether, and then with acetone. Air-drying of the washed solid gave the substantially pure (carboxymethyl)ammonium isopropyl phosphonate, M.P. 149.8–150.8° C. (corr.), and analyzing as follows:

Calc'd for $C_5H_{14}NO_5P$, percent: C, 30.10; H, 7.04; N, 7.08; P, 15.56. Found, percent: C, 30.18; H, 7.14; N, 7.18; P, 15.77.

The infrared spectrum showed P-H, P→O, —C(O)OH, and (CH$_3$)CH—.

$P^{31}$ nuclear magnetic resonance analysis gave the following data:

A = −23.8 p.p.m. (doublet)
B = 15.4 p.p.m. (doublet)
$J_{PH}$ = co 630–640 c./s. (for O—CH=split)
Center of gravity = −3.7 p.p.m.

$H^1$ nuclear magnetic resonance analysis gave the following data:

| Chemical shift at p.p.m. | Number of H+ | | Assignment |
|---|---|---|---|
| | Relative | Theory | |
| 126 | 0.5 | 0.5 | One half of P-H proton. |
| 5.30 | 4.2 | 4.0 | Labile protons: HOD, OH, NH. |
| 5.0 | 1.4 | 1.0 | O—CH= |
| 4.33 | 2.2 | 2.0 | —C(O)CH$_2$— |
| 1.90 | 0.5 | 0.5 | One half of P-H. |
| 1.75 | 6.0 | 6.0 | —HC(CH$_3$)$_2$ |

Example 3

This example shows preparation of a (1-carboxyalkyl)-ammonium phosphonate, rather than of the mono-ester by using water as a diluent and then removing the water by heating.

A mixture consisting of 20.0 g. (0.27 mole) of glycine, 30 ml. (0.27 mole) of dimethyl phosphonate and sufficient water to form a solution upon warming, was heated gently on the steam bath for a few hours to solution, and then allowed to stand overnight. The water was removed by heating under vacuum, leaving a colorless syrup which gave a crystalline precipitate upon mixing with methanol. Recrystallization from a mixture of acetone and water gave the substantially pure (carboxymethyl)ammonium phosphonate, M.P. 158.0–159.0° C., and analyzing as follows:

Calc'd for $C_2H_8NO_5P$, percent: C, 15.29; H, 5.09; N, 8.92; P, 19.74.

Found, percent: C, 15.31; H, 5.23; N, 9.09; P, 19.53;

Titration of the compound showed a dibasic material, a neutralization equivalent of 159.5 being obtained as against 157.0, the calculated value.

Example 4

A mixture consisting of 20.0 g. (0.22 mole) of DL-alanine, 30 ml. (0.22 mole) of di-n-butyl phosphonate and 50 ml. of distilled water was heated gently on the steam bath to obtain a clear solution, and was then allowed to stand at room temperature overnight. Acetone was added to the resulting reaction mixture, whereupon a white solid precipitated. The whole was then concentrated to remove most of the solvent, cooled, and filtered to remove some solid, unreacted alanine. Concentration of the filtrate gave crystals of the crude, desired product. The crystals were triturated with acetone, filtered off and air dried to give the substantially pure butyl N-(1-carboxyethyl)ammonium phosphonate which analyzed 37.41% C and 8.22% N, as against 37.20 and 7.93, the respective claculated values for $C_{17}H_{18}NO_5P$.

The infrared spectrum showed presence of the groupings P-H, P→O, $NH_{4+}$ and N—H which is consistent with the structure.

Operating as above, but using α-aminoalkanoic acids other than glycine or alanine, other alkyl (1-carboxylalkyl)ammonium phosphonates or (1-carboxyalkyl)ammonium phosphonates, are obtained. Thus, by substituting leucine for alanine in the above example, there is obtained butyl (1 - carboxy-3-methylbutyl)ammonium phosphonate. Also, by employing di-n-hexyl phosphonate as the phosphorus reactant and α-aminobutyric acid as the amine reactant, using hexanol as the inert diluent, there is obtained (1-carboxypropyl)ammonium n-hexyl phosphonate.

The present invention is not to be considered as limited by the above examples which are given by way of illustration, only. It will be obvious to those skilled in the art that many modifications can be made within the spirit of the invention, which is limited only by the terms of the appended claims.

What I claim is:

1. A compound of the formula

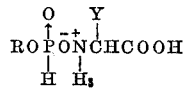

wherein R is selected from the class consisting of hydrogen and alkyl radicals of from 1 to 8 carbon atoms and Y is selected from the class consisting of hydrogen and alkyl radicals of from 1 to 4 carbon atoms.

2. The compound defined in claim 1, further limited in that R is alkyl and Y is hydrogen.

3. The compound defined in claim 1, further limited in that R and Y are alkyl.

4. The compound defined in claim 1, further limited in that R and Y are hydrogen.

5. The compound defined in claim 1, further limited in that R is hydrogen and Y is alkyl.

6. The methyl ester of (carboxymethyl)ammonium phosphonate.

7. The isopropyl ester of (carboxymethyl)ammonium phosphonate.

8. (Carboxymethyl)ammonium phosphonate.

9. The butyl ester of (1-carboxyethyl)ammonium phosphonate.

References Cited

UNITED STATES PATENTS 2,674,616    4/1954    Morris ---------- 260—924 X

OTHER REFERENCES

P. R. Hammond, "A Simple Preparation of Alkyl Ammonium Phophonates and Some Comments on the Reaction," J. Chem. Soc., London, pp. 2521–2522 (1962).

CHARLES B. PARKER, *Primary Examiner.*

B. BILLIAN, A. H. SUTTON, *Assistant Examiner.*

U.S. Cl. X.R.

260—534, 987, 941, 983; 71—71; 167—22